United States Patent [19]

Wikoff

[11] 4,242,798
[45] Jan. 6, 1981

[54] HAND HELD BAND SAW

[75] Inventor: Mark W. Wikoff, Cincinnati, Ohio

[73] Assignee: Best & Donovan, Cincinnati, Ohio

[21] Appl. No.: 969,854

[22] Filed: Dec. 15, 1978

Related U.S. Application Data

[60] Division of Ser. No. 881,734, Feb. 27, 1978, Pat. No. 4,160,320, which is a continuation-in-part of Ser. No. 785,037, Apr. 6, 1977, abandoned.

[51] Int. Cl.³ .............................................. B27B 13/08
[52] U.S. Cl. ...................................................... 30/380
[58] Field of Search ...................... 30/380; 83/817, 814

[56] References Cited

U.S. PATENT DOCUMENTS

| 2,481,675 | 9/1949 | Lasar | 83/817 X |
| 2,664,118 | 12/1953 | Krumbach | 83/817 |
| 4,001,937 | 1/1977 | Stelljes | 30/380 |

Primary Examiner—Jimmy C. Peters
Attorney, Agent, or Firm—Wood, Herron & Evans

[57] ABSTRACT

A hand held band saw particularly adapted to split animal carcasses. The band saw includes a novel housing structure that permits quick and easy access to the housing's interior for cleaning of the interior, and for installing a new endless saw blade. The band saw also includes a novel blade guide roller assembly, and a novel blade take-up assembly, which cooperate to permit quick and easy installation of an endless saw blade.

2 Claims, 18 Drawing Figures

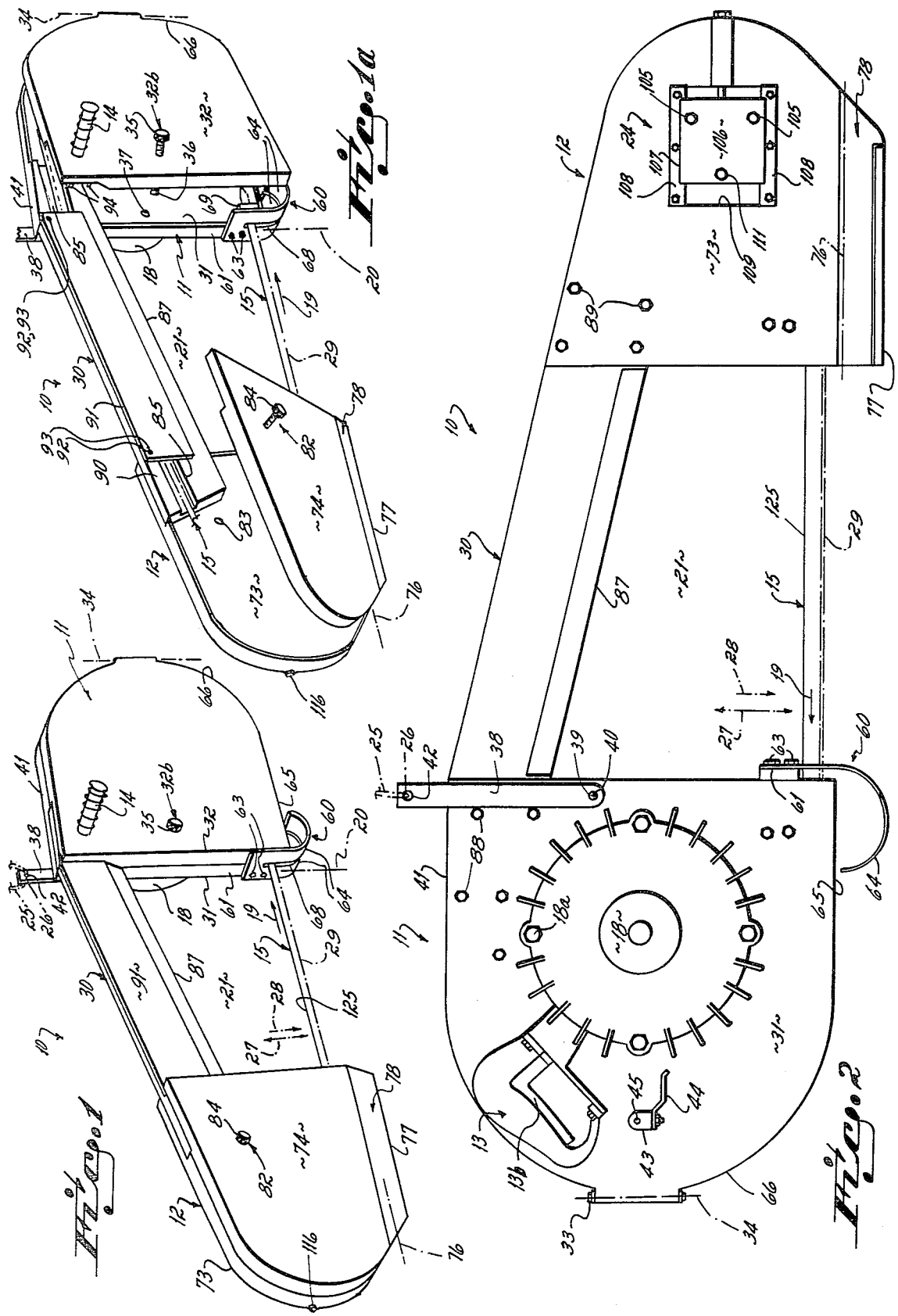

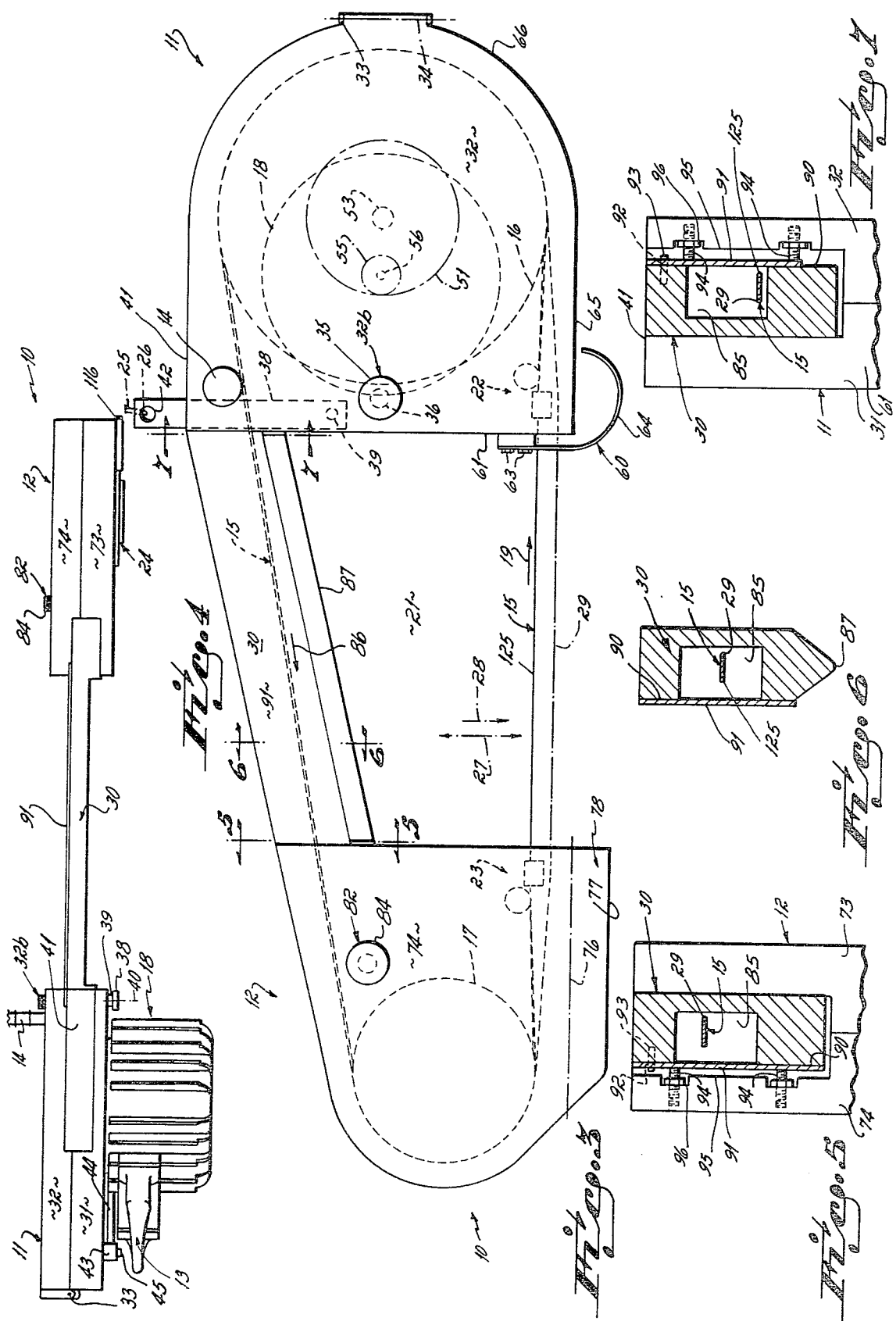

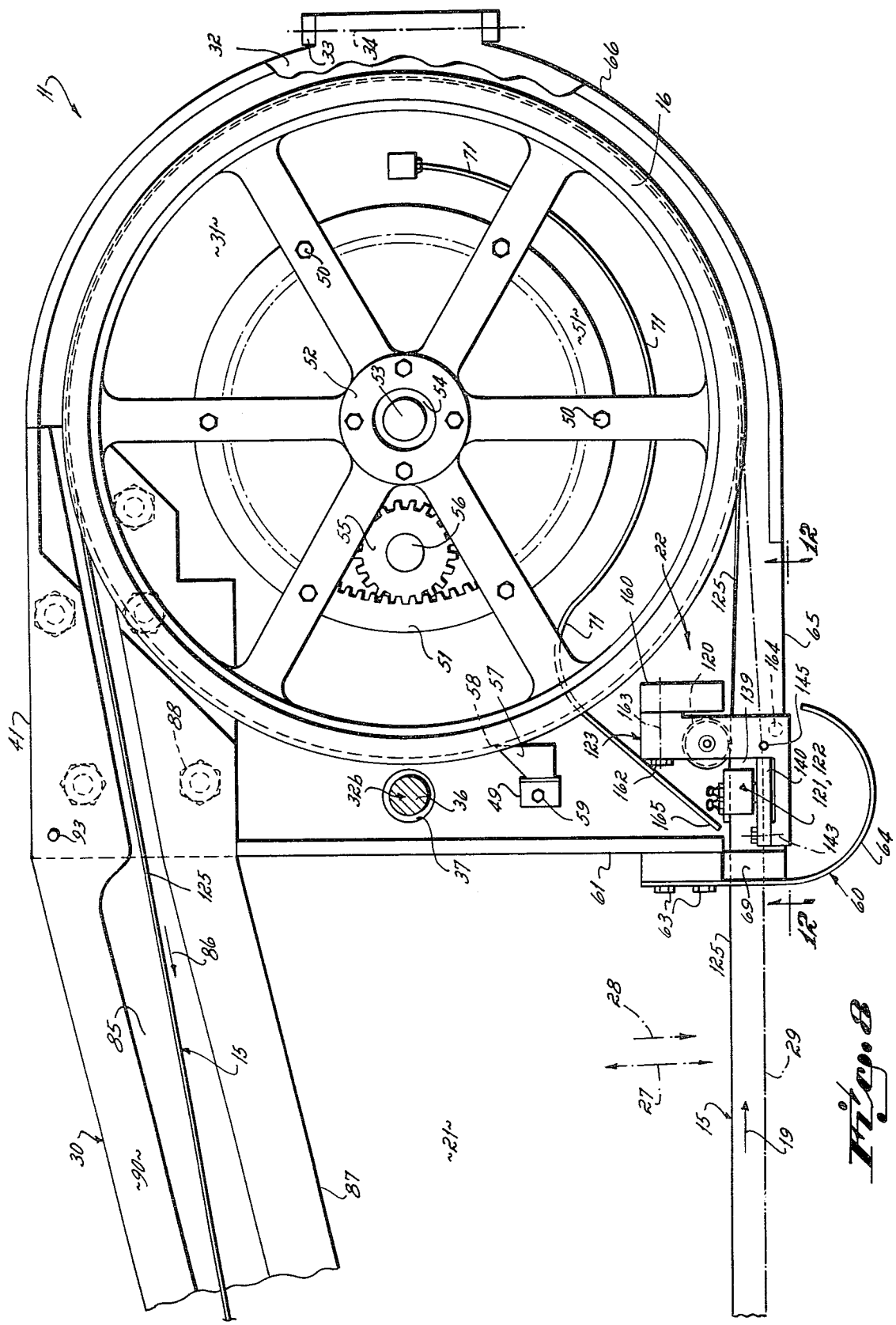

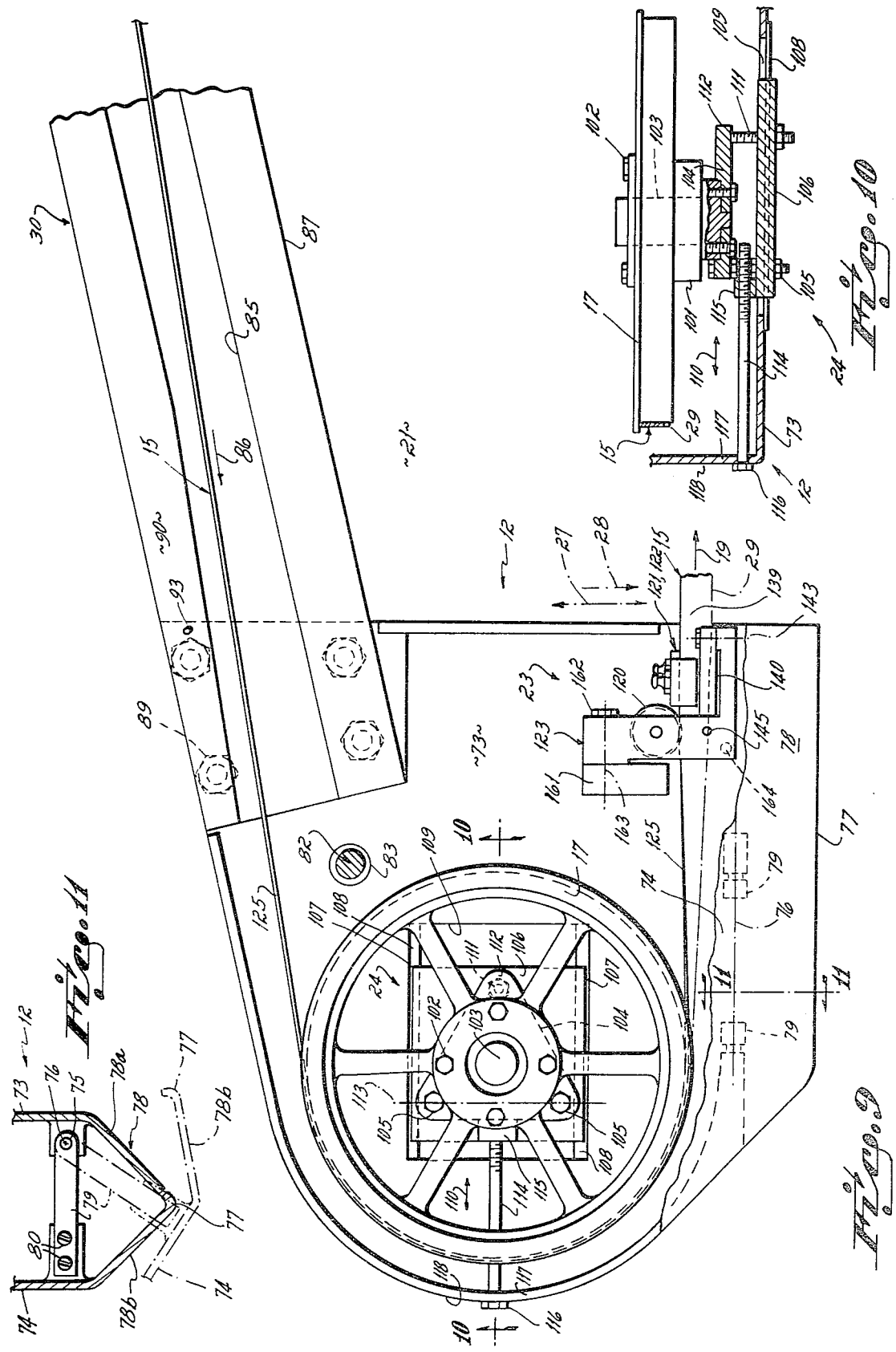

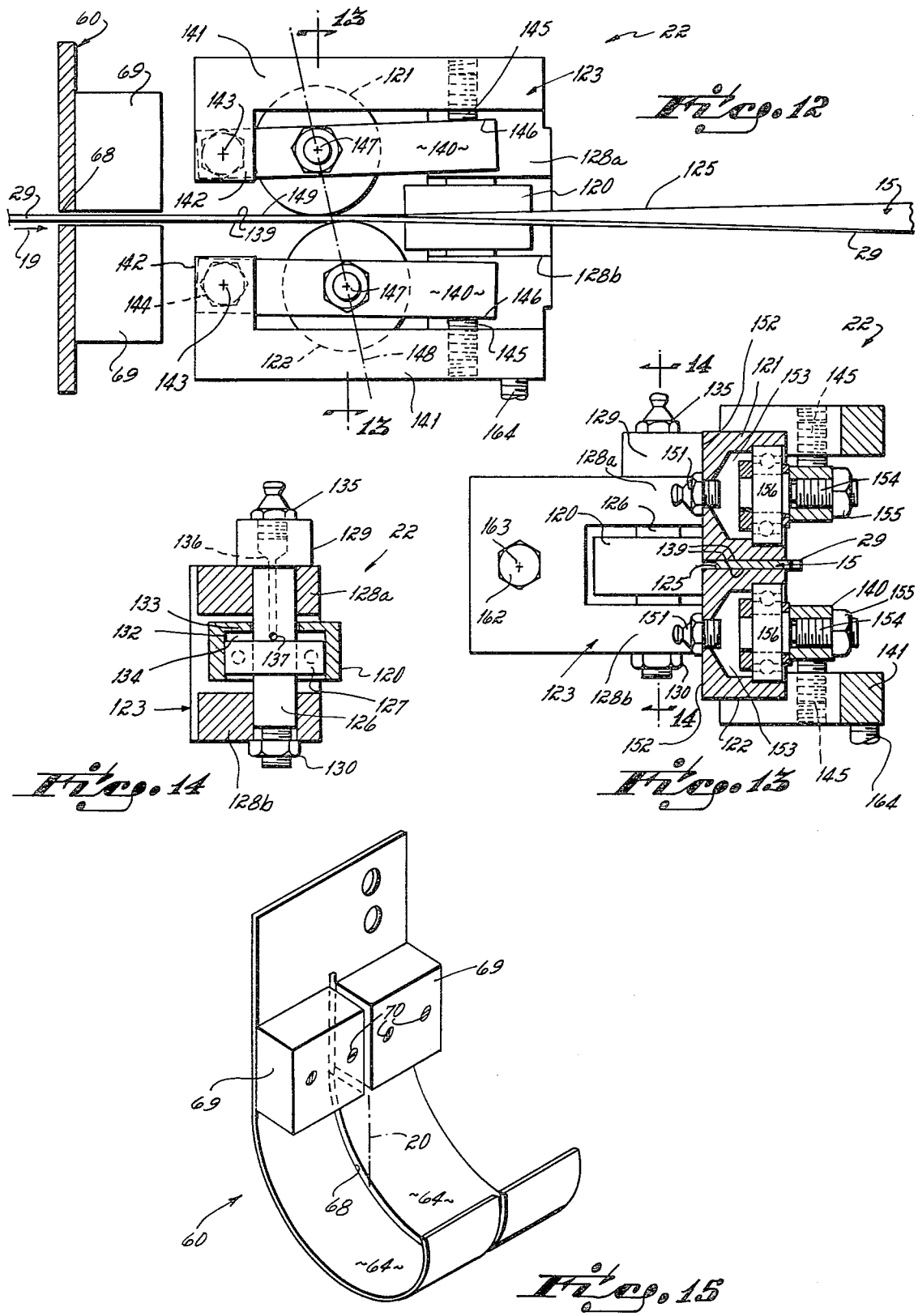

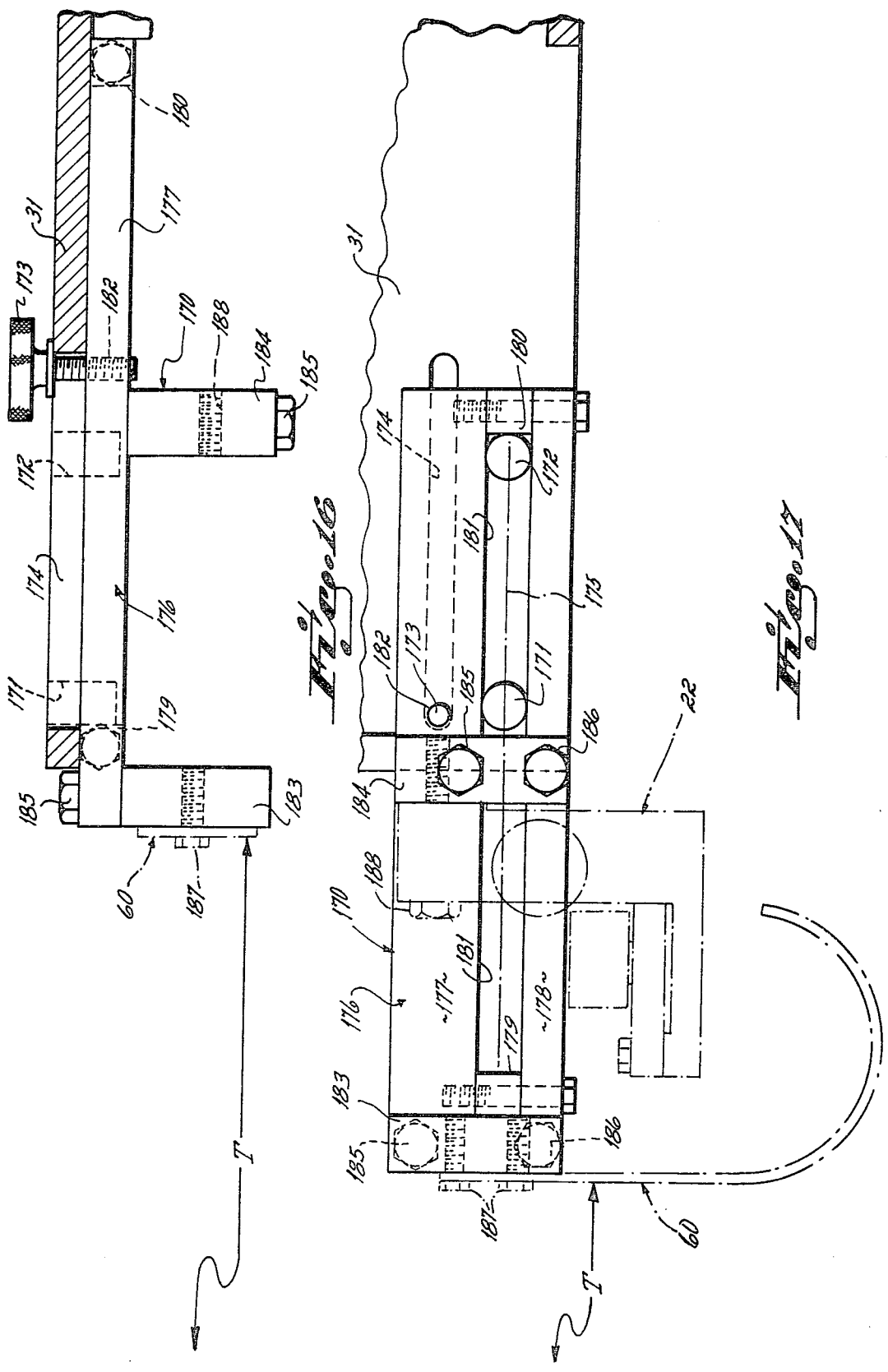

HAND HELD BAND SAW

This application is a division of application Ser. No. 881,734 filed Feb. 27, 1978, now U.S. Pat. No. 4,160,320 issued July 10, 1979, that latter application being in turn a continuation-in-part of application Ser. No. 785,037 filed Apr. 6, 1977, now abandoned, all applications being assigned to the same assignee as this application.

This invention relates to band saws. More particularly, this invention relates to a band saw of the hand-held type.

Band saws are very well known to the prior art. Band saws basically comprise a continuous or endless length saw blade in a closed loop configuration, the blade passing over a driven wheel at one end of the blade's loop and an idler wheel at the other end of the blade's loop. The band saw blade is continuously driven in a single direction about the wheels by the driven wheel, the saw toothed edge of the blade being exposed to the material to be cut at a mouth defined by the saw's housing.

Band saws also are known to the prior art in the meat processing industry. In the meat processing industry, band saws are used for cutting meat chunks or sections in the processing of meat into consumer saleable cuts. With particular reference to the hand held band saw of this invention, it should be noted that hand held band saws are also known to the meat processing industry. Generally speaking, a hand held band saw, for purposes of this application, is defined to mean a band saw of the type incorporating an endless saw blade passing over a driven wheel and an idler wheel, the band saw being manipulatable by hand into various spatial cutting orientations even though the saw may be supported from overhead, e.g., by suspending from a cable or the like. In other words, a hand held band saw, for purposes of this application, is not deemed to include a band saw of the type used in a fixed location, e.g., by mounting on a floor or the like.

As mentioned, hand held band saws are known to the prior art in the meat processing industry. Generally speaking, these hand held band saws are used to split or cut up animal carcasses into smaller carcass sections. For example, it is known to split or cut a beef carcass into right and left hand sections down the backbone of that carcass by means of a hand held band saw. Typical of hand held band saws known to the prior art are those illustrated and described in U.S. Pat. Nos. 1,374,638, 1,449,805, 1,453,335, 1,468,381, 1,512,425, 1,156,529, 2,515,345 2,596,081, 2,604,910 and 3,121,910.

However, the hand held band saws of the prior art which are known to applicant provide a couple of problems to the operator or user of the hand held band saw. A first problem arises in connection with the removal of an endless saw blade from the saw's housing, and the installation of a new or re-sharpened saw blade with the saw's housing. Such is required when the endless saw blade becomes dull, or when the saw blade breaks. A second problem arises in connection with cleaning the structural interior of the hand held saw's housing. The interior of the housing, because of the nature of the product being cut when the hand held band saw is used in the meat processing industry, requires a periodic cleaning to maintain optimum operating cutting characteristics of the saw, as well as to maintain cleanliness standards established in that industry. In connection with hand held band saws of commercially used prior art structures of which I have knowledge, it is relatively difficult and time consuming to change the saw blade on those saws bacause of the relatively complex guide roller and saw blade tensioning apparatus employed. Furthermore, and as to those commercially used prior art hand held band saws which are acceptable from an operator safety standpoint, the housing interiors are not readily and easily accessible for thorough cleansing or for blade replacement. In other words, the housing structures of those hand held band saws which maintain the enclosure integrity required for the housing when the saw is in use (so as to comply with desirable operator safety standards) are relatively difficult to open or close for cleansing or blade changing purposes.

Accordingly, it has been one objective of this invention to provide an improved hand held band saw that incorporates a novel housing structure, that housing structure permitting ready and easy access to the housing's interior for changing of the saw blade or cleansing of that interior while maintaining optimum closure integrity for the housing from an operator safety standpoint when the saw is in use.

It has been another objective of this invention to provide an improved hand held band saw structure which incorporates at least one of a novel guide roller assembly system, and a novel blade take-up assembly, which assembly permits the endless blade of the band saw to be easily and simply installed, and which permits the tracking of that blade to be easily and simply adjusted once the blade is installed.

Other objectives and advantages of this invention will be more apparent from the following detailed description taken in conjunction with the drawings in which:

FIG. 1 is a perspective view of an improved band saw;

FIG. 1a is a diagrammatic perspective view illustrating the housing doors in an open position, the internal parts not being shown;

FIG. 2 is a side elevational view of one side of an improved hand held band saw in accord with the principles of this invention;

FIG. 3 is a side elevational view of the other side of the improved hand held band saw;

FIG. 4 is a top view thereof;

FIG. 5 is a cross-sectional view taken along line 5—5 of FIG. 3;

FIG. 6 is a cross-sectional view taken along line 6—6 of FIG. 3;

FIG. 7 is a cross-sectional view taken along line 7—7 of FIG. 3;

FIG. 8 is a partially broken away side elevational view of the driven wheel end of the hand held band saw as taken from that side illustrated in FIG. 3;

FIG. 9 is a partially broken away side elevational view of the idler wheel end of the hand held band saw as taken from that side illustrated in FIG. 3;

FIG. 10 is a cross-sectional view taken along line 10—10 of FIG. 9;

FIG. 11 is a cross-sectional view taken along line 11—11 of FIG. 9;

FIG. 12 is a cross-sectional view taken along line 12—12 of FIG. 8;

FIG. 13 is a cross-sectional view taken along line 13—13 of FIG. 12;

FIG. 14 is a cross-sectional view taken along line 14—14 of FIG. 13;

FIG. 15 is a perspective view of the guide plate;

FIG. 16 is a top view of an alternative alignment roller assembly in the retracted position; and FIG. 17 is a side view of that alternative assembly but showing that assembly in the extended position.

GENERAL STRUCTURE

The overall structure of the improved hand held band saw 10 of this invention is particularly illustrated in FIGS. 1, 1a, 2, 3 and 4. As shown in those Figures, the improved hand held band saw 10 includes a housing comprised of a driven wheel housing 11 and an idler wheel housing 12. The driven wheel housing 11 includes handles 13, 14, one on each side thereof, for grasping by the operator so as to manually manipulate the saw 10 as desired. An endless length saw toothed blade 15, i.e., a saw blade in loop configuration, is engaged in friction drive relation with driven wheel 16 in the driven wheel housing 11, and is also engaged with idler wheel 17 in the idler wheel housing 12. The endless saw blade 15 is adapted to be driven by motor 18 in the direction of arrow 19 as illustrated in the Figures.

The endless saw blade 15 is adapted to cooperate with a tracking assembly within the housing 11, 12, the tracking assembly functioning to translate the blade into a planar attitude parallel to the median longitudinal plane 20 of the housing 11, 12 from the normal band attitude as the blade traverses throat 21 of the saw 10. That portion of the tracking assembly which so translates the blade 15 from the normal band attitude (in which the blade is disposed normal to the housing's median plane 20 as shown in FIGS. 5–7) into the cutting attitude (in which the band is parallel to the housing's median plane 20) include a first alignment roller assembly 22 in the driven wheel housing 11 and a second alignment roller assembly 23 in the idler wheel housing 12. The tracking assembly also includes a blade take-up assembly 24 and the alignment roller assemblies 22, 23 are adjustable to provide correct tracking of the endless blade 15 over the driven 16 and idler 17 wheels during operation of the saw.

In use by an operator, the saw 10 may be connected with an overhead support (not shown) by a cable 25 attached to the saw's housing 11, as at 26. The overhead support (not shown) may be in the nature of a counterbalance mechanism (not shown) which aids the operator in manipulating the saw in an up-and-down direction illustrated by phantom arrow 27. In other words, the overhead support and counterbalance apparatus serves to reduce the saw's weight from an operator's standpoint. The saw 10 is hand manipulatable or orientatable, however, as the operator grips handle 13 with one hand and handle 14 with the other hand, thereby permitting the spatial orientation of the saw to be as desired by the user. With the saw blade 15 continuously running in direction illustrated by arrow 19, and oriented in a generally horizontal plane relative to floor level, the saw 10 can be simply moved down through an animal carcass's backbone in a direction illustrated by phantom arrow 28 from the upper or tail end of that carcass to the lower or shoulder end of that carcass so as to split the carcass into right and left hand sections as that carcass hangs down from an overhead conveyor.

THE HOUSING

The housing structure of the improved hand held band saw is particularly illustrated in FIGS. 3–9 and 11. As shown in those Figures, and as previously mentioned, the housing structure basically includes a driven wheel housing 11 and an idler wheel housing 12. The two housings 11, 12 are connected by a crossbar section 30. The crossbar section 30 and the two end housings 11, 12 cooperate to define the throat area 21 of the saw through which the endless saw blade 15 runs. Note the blade 15 runs through the throat area 21 in an orientation that presents the blade's saw toothed edge 29 as the exterior edge of the blade.

The driven wheel housing 11 includes a main housing section 31 and a door 32, the door being hingedly connected by pin 33 on a hinge axis 34 which is perpendicular to the cutting path 19 of the saw blade 15, see FIGS. 1, 1a and 8. The housing's main section 31 carries the motor 18 fixed to that section by bolts 18a. The first handle 13 is mounted on the casing of motor 18, the handle including a trigger switch 13b by means of which motor 18 (and, hence, the saw blade 15) can be activated by an operator. The pistol grip handle 13 is located in a plane generally parallel to the median plane 20 of the saw blade's housing 11, 12. The second handle 14 is mounted on the outside of the door 32, that handle being a rod-type handle which extends generally normal to the median plane 20 of the saw 10. The pistol grip handle 13 is adapted to be gripped by the right hand of the saw's operator, and the bar handle 14 is adapted to be gripped by the left hand of the saw's operator, so that the saw 10 can be easily manipulated in use into the various spatial orientations desired. The door 32 is maintained in closure relation with the main section 31 by door bolt 32b. The door bolt 32b is provided with a knurled knob 35 on the exterior end thereof, the threaded end 36 of the bolt being received in a threaded cavity 36 on the interior face of the main housing's main section 31 so as to provide a latch by which the door 32 is kept in closure relation with the housing's main section.

The exterior of the housing's main section 31 also mounts a connector bar 38 pivotally connected to that housing section by pin 39, that pivotal connection being generally located adjacent the center of gravity of the saw and defining a pivot axis 40 normal to the median plane 20 of the saw's housing 11, 12. The connector bar 38 is of a length sufficient to extend upwardly beyond the top edge 41 of the housing's main section 31, and define a hole 42 at the top or free end thereof. A cable hook 25 is receivable in the connector bar's hole 42 to support the saw 10 from an overhead support, e.g., a counterbalance mechanism (not shown). The exterior face of the driven wheel housing's main section 31 also mounts a flush valve 43 having an on/off handle 44, the valve and valve handle being part of a flushing system described in greater detail hereinafter. The flush valve 43 is provided with a connector 45 that permits the valve 43 to be connected to a fluid, e.g., water, source.

The driven wheel housing's interior includes a drive mechanism for the endless saw blade 15. The drive mechanism includes driven wheel 16 which is bolted, as at 50, to a concentric ring gear 51. The driven wheel 16 includes hub 52, that hub 52 being carried on a fixed central shaft 53 by bearings 54. The fixed shaft 53 is mounted in the housing's main section 31 by structure not shown. A pinion 55, mounted on shaft 56 of the motor 18, is engaged with the driven wheel's ring gear 51. Thus, the motor 18, pinion 55 and ring gear 51 thereby serve to rotate or drive the driven wheel 16 when the motor is activated by trigger switch 13b.

A scraper block 57, preferably fabricated of a polyethylene, is adapted to bear against the exterior face 58 of the driven wheel 16 on that side of the wheel which is free of the saw blade 15. The scraper block 57 serves to scrape fat and bone dust from the driven wheel 16 during use of the saw in the meat processing industry. The scraper block 57 is fixed to bracket 49, that bracket being mounted to the inside face of the housing's main section by bolt 59.

The driven wheel housing's main section mounts a curved guide plate 60 on the inside or throat edge 61 thereof in that area of the blade 15 entry into that housing 11, see FIGS. 8 and 15. The curved guide plate 60 extends or curves outwardly relative to the throat 21 of the band saw 10, and is mounted to the housing's main section 31 by bolts 63. The guide plate 60 includes curved feet 64 that curve outwardly from the inside edge 61 of the driven wheel housing's main section 31 back toward the bottom edge 65 of that section 31, i.e., that terminate between the end edges 61, 66 of that section 31. The guide plate 60 is comprised of two separate or spaced feet 64 that define a slot 68 therebetween, as illustrated in FIG. 15, the saw blade 15 passing through that slot 68. Note particularly that each of the feet 64, in the area adjacent to where the endless blade 15 passes therebetween, mounts a scraper block 69, thereby locating a scraper block on each side of the endless saw blade, see FIGS. 8 and 12. Each block 69 preferably is fabricated of polyethylene, and is bolted as at 70 to the guard plate. The scraper blocks serve to prevent chunks of fat or bone dust from passing into the interior of the driven wheel housing 12 during use. The driven wheel housing 12 also carries an alignment roller assembly 22 and a blade flushing pipe 71 interiorly thereof, these structural components being described in greater detail below.

The idler wheel housing 12 also includes a main section 73 and a door 74, the door being hingedly connected by pin 75 on a hinge axis 76 which is parallel to the cutting path 19 of the saw blade 15, see FIGS. 9 and 11. The main section 73 and the door 74 cooperate, on the bottom edge 77 thereof, to define a V-shaped nose 78 in cross section, note the solid line of FIG. 11. One half 78a of the V-shaped nose 78 is formed from the bottom edge of main section 73, and the other half 78b of the nose 78 is formed from the bottom edge of door 74. In other words, the idler wheel housing 11 is provided with a nose 78 on the throat edge or bottom edge 77 of that housing with main section 73 of the housing defining a linear portion 78a of that V-shaped nose section, the door 74 defining a linear section plus the V-tip as 78b, see FIG. 11. This V-shaped nose is an important structural feature of the band saw's idler wheel housing 11 for the reason that it permits that portion to pass through an animal carcass without getting hung up thereon as it might if that bottom edge 77 were planar. More particularly, the idler wheel housing's door 74 is connected to the main section 73 by spaced cross links or bars 79 to define the horizontal hinge axis 76, each bar being pivotally pinned as at 75 to main section 73 at one end and fixed by screws 80 to the door 74 at the other end. This door hinge 79 structure permits the door 74 to be swung down so that the door half 78b of the V nose 78 swings under the main section half 78a of the V nose 78 as the door is opened. The door 74 is maintained in fixed relation with idler wheel housing's main section 73 by a thumb bolt 82. The thumb bolt 82 passes through the door 74 and is threaded on the exterior of the housing, and the threaded portion is received into collar 83 integral with the interior face of the main section 73. Knurled head 84 of the bolt 82 permits easy latching and unlatching of the door 74.

The idler wheel housing 12 carries the idler wheel 17 therein. The idler wheel 17 is mounted on a blade take-up assembly 24 described in greater detail below. It is through the take-up assembly 24 that the idler wheel 17 is mounted to the main section 73 of the idler wheel housing 12. The idler wheel housing 12 also mounts an alignment roller assembly 23 identical to the alignment roller assembly 22 carried in the driven wheel housing 11. This alignment roller assembly 23 is likewise described in greater detail below.

The idler wheel housing 12 and the driven wheel housing 11 are connected together one with the other in rigid or fixed relation by the crossbar section 30 of the saw's housing, see FIGS. 8 and 9. The crossbar section 30 is of a structurally rigid nature, and includes channel 85 defined therein through which the saw blade 15 passes on its return run shown by arrow 86. Note particularly that the crossbar section 30, at the mouth or bottom edge 87 thereof, is also provided with a V-shaped nose configuration, see particularly FIG. 6. This V-shaped nose of the crossbar 30 at the mouth edge 87 thereof permits the crossbar to pass down between, for example, the right half and left half carcass sections as the carcass is being split so the saw 10 does not get hung up on either section. The crossbar 30 is bolted to the driven wheel housing 11 by five bolts 88 at one end, and the crossbar is bolted to the idler wheel housing 12 by four bolts 89 at the other end, thereby rigidly and fixedly connecting the housings 11, 12 and crossbar 30 into a one-piece housing for the saw 10.

The crossbar 30 is adapted to be covered on that surface 90 which defines the channel 85 by a separate cover plate 91, see FIGS. 5–9. The cover plate 91 is provided with a hole 92 at each end thereof, each hole cooperating with a locater pin 93 fixed to the crossbar 30. The cover plate 91 is, thereby, adapted to be located in its assembled position by virtue of the crossbar's locater pins 93 being received through the holes 92 in the cover plate 91 at each end thereof, see FIGS. 5 and 7. Further, the cover plate 91 is retained in assembled relation with the crossbar 30 by cooperating of latch structure fixed to the driven wheel housing's door 32 and to the idler wheel housing's door 74 upon closure of those doors as shown in FIGS. 5 and 7. In other words, the doors 32, 74 of the driven wheel housing 11 and the idler wheel housing 12, respectively, also cooperate with the crossbar's cover plate 91 to maintain that cover plate in assembled relation with the crossbar. The latch structure which provides this function includes, on each door 32, 74, a pair of threaded studs 94 threaded into the door, the studs extending out beyond the inner face 95 of the door a limited extent, and being retained in that extended attitude by set nuts 96. When the doors are closed, i.e., when the housing is assembled as illustrated in FIGS. 1 and 2, the spaced studs 94 on the door overlie and bear against the cover plate 91 for the crossbar 30, thereby retaining same in covering relation with the crossbar so as to enclose the band saw blade in the return run 86 of that blade through the crossbar. In other words, the doors 32, 74 overlie the cover plate 91 so as to maintain it in the assembled or closure attitude.

This band saw housing structure completely encloses the band saw blade 15 during use of the hand held band saw 10 except, of course, for exposed or cutting run through the mouth 21 of the saw. In other words, the door 32 and main section 31 of the driven wheel housing 11, and the door 74 and main section 73 of the idler wheel housing 11, cooperate to enclose totally the saw blade 15 portions within those sections. Further, the cover plate 91 and the crossbar 30 cooperate to enclose fully the return run of the saw blade in the crossbar section of the saw housing. This is highly desirable from an operator safety standpoint. However, both the driven wheel housing 11, the idler wheel housing 12 and the crossbar 30 are easily opened and exposed for cleaning or flushing, or for changing of the blade, simply by unlatching the doors 32, 74 of each housing by releasing the thumb bolts 32b, 82. When the thumb bolts 32b, 82 are disengaged, the doors 11, 12 may be pivoted open about respective pivot axes 34 and 76. With the doors 32, 74 pivoted open, the doors' studs 94 are released against the cover plate 91 of the crossbar 30, thereby permitting the cover plate to be simply lifted off the crossbar so as to expose the blade 15 and the channel 85 defined in the crossbar. With the interior of the saw housing completely exposed, the housing may be flushed clean by a water hosing or otherwise, or the saw blade 15 may be easily changed or a new blade installed.

THE TRACKING ASSEMBLY

The tracking assembly for the hand held band saw 10 of this invention is particularly illustrated in FIGS. 8–14. The tracking assembly basically comprises a blade take-up structure 24 connecting the idler wheel 17 and the idler wheel housing 12, an alignment roller assembly 23 in the idler wheel housing, and an alignment roller assembly 22 in the driven wheel housing 11.

The blade take-up assembly 24 is primarily illustrated in FIGS. 9 and 10. As shown therein, the idler wheel 17 is mounted on a hub 101 by bolts 102. The hub 101 is rotatably carried on shaft 103 by bearings (not shown). The shaft 103 is fixed to a triangular mounting plate 104, that mounting plate being connected by bolts 105 to a slide plate 106. The bolted connection of the mounting plate 104 to the slide plate 106 is not structurally rigid, i.e., permits a limited tilting motion between the mounting plate 104 and the slide plate 106. In other words, the idler wheel 17 is adapted to tilt or angle relative to the slide plate 106 because the mounting plate 104 to which it is connected is adapted to angle or tilt relative to the slide plate. The slide plate 106 includes rails 107 along opposed side edges thereof, those rails being slidingly received on ribs 108 defined along the parallel side edges of hole 109 in the idler wheel housing's main section 73. Thus, the slide plate is adapted ot reciprocate or slide in a linear path 110 defined by the slide ribs, that path being parallel to the cutting or exposed run 19 of the saw blade 15.

The idler wheel 17 is tiltingly mounted to the slide plate 106 as previously noted. The angle or degree of tilt of the idler wheel 17 relative to the slide plate 106 is regulated by a first adjustment bolt 111 connected to the slide plate, see FIG. 10. As shown in that Figure, the first adjustment bolt 111 is movable in a direction normal to the plane of the slide plate 106, and is adapted to bear against the unconnected point 112 of the idler wheel's triangular mount plate 104 on the underside thereof. The first adjustment bolt 111 is thereby adapted to tilt the idler wheel 17 about a tilt axis 113 defined by the connector bolts 105 that connect the mount plate with the slide plate, see FIG. 9. Further, the slide plate 106 is positionable along slide ribs 108 by a second adjustment bolt 114. The second adjustment bolt 114 is threadedly connected with collar 115 on the slide plate 106, and passes through the idler wheel housing's main section 73 with the head end thereof bearing against wall portion 117 of that section 73, see FIG. 10. Turning of the second adjustment bolt 114 will cause the slide plate 106 to slide toward the outer edge 118 of the idler wheel housing 12, thereby tensioning the saw blade 15 between the idler wheel 17 and the driven wheel 16. The idler wheel 17 is tilted relative to the plane of the slide plate 106 by the first adjustment bolt 111 until an angular position of that idler wheel relative to the plane of the driven wheel 16 is achieved so that, after the blade 15 has been suitably tensioned by second adjustment bolt 114, the saw blade 15 tracks on both wheels 16, 17 without running off one or the other.

An alignment roller assembly 22 and 23 is provided in each of the drive wheel housing 11 and the idler wheel housing 12. The alignment roller assemblies 22, 23 are identical one to the other in both the housings 11, 12, the only difference being that the idler wheel roller assemblies are positioned to face toward one another as illustrated in FIG. 1. The alignment roller assembly 22, 23 is particularly illustrated in FIGS. 8 and 9, and 12–14. The alignment roller assembly 23 in the idler wheel housing 12, cooperates to transpose the endless saw blade 15 from a return run attitude normal to the vertical plane 20 of the drive 16 and idler 17 wheels into a cutting run attitude parallel to that plane, and the alignment roller assembly 22 cooperates to transpose the endless saw blade from that cutting run attitude parallel to the plane of the idler 17 and driven 16 wheels to a return run attitude normal to the vertical plane 20. This transposition of the endless saw blade 15 is, of course, necessary to permit the saw blade to encircle the driven 16 and idler 17 wheels in planar relation with the exterior periphery thereof.

As illustrated in FIGS. 12–14, each alignment roller assembly 22, 23 includes a set of three rollers 120–122 carried on an L-shaped forked bracket 123. The blade edge roller 120 is vertically oriented in a plane parallel to the cutting run of the saw blade 15 and to the median plane 20 of the saw housing, that roller being adapted to bear against non-toothed edge 125 of the blade 15. The edge roller 120 is carried on a stationary shaft 126 by roller bearings 127, that stationary shaft being fixed between upright arms 128 of the roller assembly bracket 123, see FIG. 14. Shoulder 129 of the stationary shaft 126 sits against upright arm 128a of the bracket 123 and nut 130 holds the shaft 126 in fixed relation with arm 128b of the bracket, thereby permanently locating the edge roller 120 in the desired position relative to the bracket 123.

The edge roller 120 is of a generally cup-shaped cross-sectional configuration, the roller bearings 127 being press fit against the inside wall 132 of the roller 120 but spaced from floor 133 of the roller 120 to define a grease cup 134 space between the bearings 127 and floor 133. The head end of the stationary shaft 126 mounts a grease fitting 135, and the shaft itself defines a grease bore 136 opening at port 137 in the shaft. Note the grease port 137 opens into grease cup 134 area, thereby permitting grease to be introduced into the roller bearings 127 and to maintain a supply of grease for those roller bearings.

Each alignment roller assembly 22, 23 also includes two coplanar face rollers 121, 122 adapted to bear against the side faces 139 of the blade 15. The face rollers 121, 122 are, therefore, in a plane perpendicular to the plane of the edge roller 120. The face rollers 121, 122 are juxtaposed one adjacent the other, and each is rotatably mounted to a swing arm 140. Each swing arm 140 is pivotally mounted on a side leg 141 of the alignment roller assembly's bracket 123 at a toe 142 thereof, the pivot axis 143 so defined being parallel to the plane of the edge roller 120. The pivotal connection of each swing arm 140 with a side leg 141 is established by bolt 144. An adjustment screw 145 is threaded in each of the bracket's legs 141 at the upright arm 128 end thereof, the screw 145 being adapted to bear against the outer side edge 146 of the associated swing arm 140. Turning of the adjustment screws 145 permits the side face rollers 121, 122 to be forced closer to one another, thereby exerting pressure on the endless blade's side faces 139 which pass therebetween. Note particularly that the rotational axes 147 of the side face rollers 121, 122 are disposed on a line 148 which is angulated relative to the travel path 19 of the blade 15, and relative to the plane 149 of the edge roller 120. This angulation of the side face rollers 121, 122, relative to the edge roller's plane 149, as opposed to orienting those side face rollers on a center line (not shown), that is perpendicular to the edge roller's plane, permits greater twisting pressure to be exerted against the endless blade 15, and, thereby, permits greater control to be exerted over alignment and tracking of that blade. The swing arms 140 and adjustment screws 145 permit easy and quick changing of the saw blade 15.

Each side face roller 121, 122, as illustrated in FIG. 13, is provided with a grease fitting 151 threaded into the top face 152 thereof. The grease fitting 151 opens into a grease cup 153 area of the roller, the roller thereby functioning also as a grease cup. The rollers 121, 122 are mounted on swing arm 140 by threaded shaft 154, that shaft being fixed to the swing arm by nut 155. Roller bearings 156 interposed between the shaft 154 and the cup-shaped rollers 121, 122 permit rotation of the side face roller about that shaft on the rotational axis 147. Thus, the structural configuration of each side face roller 121, 122 also is in the form of a cup so as to provide a grease storage area 153 with the roller. This structure permits periodic greasing of the rollers 121, 122 so as to maintain a free rolling roller bearings 156.

Each roller assembly's bracket 123 is connected or mounted to a housing's main section 31 or 73 on mounting block 160 as illustrated in FIG. 8 for driven wheel housing 11, or on mounting block 161 as illustrated in FIG. 9 for idler wheel housing 12 by bolt 162. The blocks 160, 161 are fixed in place to the housings 11, 12. The connector bolts 162 each define a pivot axis 163 in the median plane of the edge roller 120. Alignment screws 164 are received in both the housing's main sections 31, 73, and each screw 164 is adapted to bear against its associated bracket 123, as shown in FIG. 13. In proper positioning of the alignment rollers 120–122 (and, hence, of the alignment roller assembly's bracket 123) relative to the blade 15, the alignment screw 164 permits fine alignment of that assembly with the blade, i.e., permits pivoting of that bracket about pivot axis 163, when a new blade is installed within the housing. Once the proper alignment is achieved, bolt 162 is tightened to fix the guide roller assembly 22, 23 in its proper position.

An alternative mounting structure 170 for guide roller assembly 22 is illustrated particularly in FIGS. 16 and 17. The mounting structure for guide roller assembly 22 in the FIGS. 8 and 13 embodiment includes block 160 permanently fixed to housing section 31, the assembly 22 being connected to that block 160 by bolt 162. In other words, and in the FIGS. 8 and 13 embodiment, the guide roller assembly 22 is permanently fixed in position relative to the rotational axis of drive wheel 16, although that assembly can pivot on the axis of bolt 162 when the bolt 162 is loosened. In the alternative embodiment illustrated in FIGS. 16 and 22, the guide roller assembly 22 is movably mounted so that the assembly 22 can be located between an inner position illustrated in FIG. 16 and an outer position illustrated in FIG. 17. In this alternative mounting structure 170 for guide wheel assembly 22, the assembly 22 is movable along a path parallel to the return run 19 of the endless saw blade 15 relative to the drive wheel 16.

The alternative mounting strucutre 170, as illustrated in FIG. 16, includes a pair of spaced pins 171, 172 permanently fixed to housing section 31, the pins extending inwardly from the inner face of that housing section towards the opposite housing section 32. A knurled head thumb screw 173 is received in linear slot 174 defined in the housing section 31, the linear slot being parallel to a center line 175 which includes both pins 171, 172, and being spaced above those pins in the side wall of that housing section 31. A mounting bracket 176 for guide roller assembly 22 is cooperatively engaged with the pins 171, 172 and the thumb screw 173. The mounting bracket 176 includes an upper rail 177 and a lower rail 178, those rails being spaced at each end by spacer blocks 179, 180 so as to define linear slot 181 therebetween. The bracket 176 is received in sliding relation on the pins 171, 172 through slot 181 in that bracket, and the thumb screw 173 is received in top rail 177 of that bracket in a threaded bore 182 provided therein. Thus, the mounting bracket is movable between an outer position shown in FIG. 17 where pin 172 abuts spacer 180, and an inner position shown in FIG. 16 where pin 171 abuts spacer 179, and is fixed in the desired position relative to the inner and outer limits by thumb screw 173.

The alternative mounting structure 170 also includes a front mounting arm 183 and a rear mounting arm 184 that extend transversely out from the mounting rails 177, 178, the arms being connected to the rails by separate top 185 and bottom 186 bolts. The front mounting arm 183 carried guide plate 60 as mounted by bolts 187. Thus, the guide plate 60, which is particularly illustrated in FIG. 15 (except for the locational difference in mounting holes), is also slidable between the extended and retracted positions so as to maintain its spatial relation relative to the guide roller assembly 22. The guide roller assembly 22 is fixed to the rear mounting arm 184 by bolt 188. The guide roller assemby 22 is of the same structure as illustrated in FIGS. 8 and 12–14 except that it is mounted to the sliding guide assembly 170. Thus, the guide roller assembly 22 functions, after being mounted to the sliding guide assembly 170, exactly the same as described above except that it is, as previously mentioned, extendable and retractable relative to the drive wheel 16.

The sliding guide assembly 170, in combination with the guide roller assembly 22 and the guide plate 60, has been unexpectedly found to reduce blade 15 breakage during use of the hand held band saw. In this regard, the sliding guide assembly 170, in combination with drive roller assembly 22 and guide plate 60, permits throat length T of the saw to be adjusted between maximum and minimum positions as permitted by the mounting structure 170 of this alternative embodiment. The throat length with the guide roller assembly 22 and guide plate 60 completely retracted (as shown in FIG. 16) is big enough for handling the maximum size animal on which the saw is to be used, and the throat length with the guide roller assembly 22 and guide plate 60 completely extended (as shown in FIG. 17) is small enough for the minimum sized animals to be handled with the saw. This provides a significant operating advantage to the band saw in that, when the throat length T is narrowed or widened to the preferred length for use with a given size animal, the blade is less likely to twist while cutting because less free blade is exposed, thereby allowing the operator to provide a straighter cut through the animal. Further, it has been found desirable to reduce the throat length to the minimum possible relative to the animal size being handled so as to provide the maximum distance possible between the guide roller assembly 22 and the drive wheel 16. This maximum distance between the guide roller assembly 22 and the drive wheel 16 provides a maximum distance for the blade to twist between its cutting run 19 attitude and its return run 86 attitude as it passes over the drive wheel 16, thereby reducing blade stress and increasing the useful life of the blade. In other words, it has been unexpectedly found that by maintaining the throat length T of the band saw at the minimum relative to the size of the animal being processed, the blade 15 is less likely to twist during cutting and the blade life is increased as the twist instance between guide roller assembly 22 and drive wheel 16 is increased, thereby providing two significant advantages to the sliding guide assembly 170.

As previously mentioned, a flush pipe or line 71 is used in connection with the hand held band saw 10 of this invention, see FIGS. 2 and 8. The single flush line 71 is connected with water valve 43 at one end. The flush line 71 terminates in a nozzle 165 oriented to discharge a flow of water in a plane that is coplanar to the cutting plane of the endless saw blade 15 when that blade is in its cutting run attitude. This nozzle 165 is positioned immediately ahead of the side face rollers 121, 122 of the alignment roller assembly 22 positioned within the driven wheel housing 11 and only a single nozzle is used in the driven wheel housing 11, and no nozzle is used in the idler wheel housing 12. In other words, the nozzle 165 is positioned upstream of the alignment roller assembly 22 relative to the motion path 19 of the saw blade's cutting run. Thus, the water flow discharge from the nozzle 165 flows against top edge 125 of the endless blade 15, and flows onto and over the side faces 139 thereof to at least partially rinse the blade prior to that blade being twisted from the cutting attitude into the track attitute, i.e., prior to that blade passing through the alignment roller assembly 22, within the driven wheel housing 11.

Having described in detail the preferred embodiment of my invention, what I desire to claim and protect by Letters Patent is:

1. A blade take-up assembly for an idler wheel of a band saw of the endless blade type, said blade take-up assembly being connected within said saw's idler wheel housing, said blade take-up assembly comprising a slide plate slidably mounted in a hole defined in said idler wheel housing, said idler wheel housing having ribs along parallel and spaced side edges of said hole, and said slide plate having rails along opposed side edges thereof, said rails being slidably received on said ribs, a mounting plate carrying said idler wheel in rotatable relation thereon, said mounting plate being pivotally mounted to said slide plate by at least two spaced bolts, each of said bolts being oriented generally normal to said slide plate and said mounting plate, the bolted connection between said slide plate and said mounting plate being not structurally rigid for permitting a limited tilting motion of said mounting plate relative to said slide plate about a phantom tilt axis defined by said spaced bolts and generally normal to said bolts, a first threaded shaft threadedly connected to said slide plate and extending exteriorly of said housing through said housing hole, said threaded shaft being adapted to bear against said mounting plate, the position of said first threaded shaft relative to said slide plate determining the angular position of said idler wheel relative to said slide plate, and a second threaded shaft threadedly connected to said slide plate, a head on said second shaft being adapted to bear against the exterior surface of said idler wheel housing, the position of said second threaded shaft relative to said slide plate determining the position of said idler wheel relative to a driven wheel of said band saw.

2. A blade take-up assembly as set forth in claim 1, the slide path of said slide plate being generally parallel to the cutting run of said endless blade, and the pivot axis of said mounting plate being generally perpendicular to the cutting run of said endless belt.

* * * * *